Oct. 9, 1951  J. L. ROONEY  2,570,718
EYEGLASSES
Filed Oct. 13, 1947
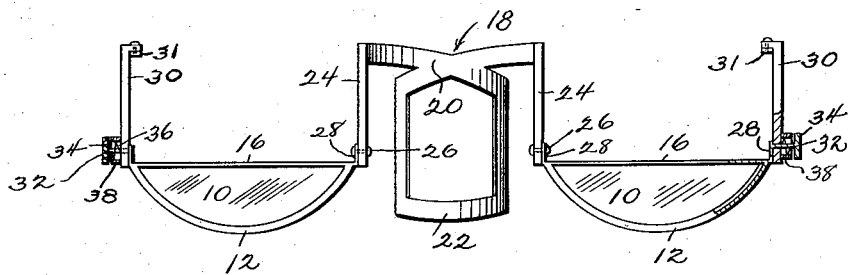
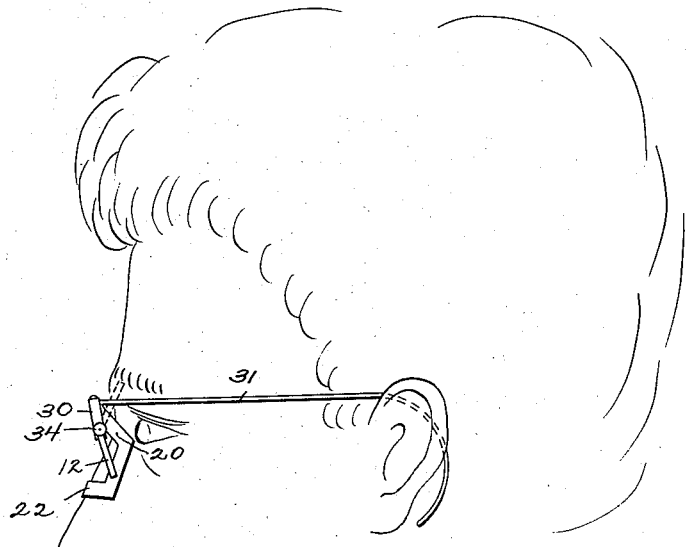
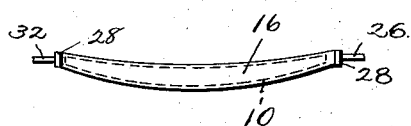
INVENTOR.
John L. Rooney,
BY Patented Oct. 9, 1951

2,570,718

UNITED STATES PATENT OFFICE 2,570,718

EYEGLASSES

John L. Rooney, Maywood, Ill.

Application October 13, 1947, Serial No. 779,609

3 Claims. (Cl. 88—41)

This invention relates to improvements in eyeglasses generally and, more particularly, eyeglasses of the character adapted for reading or other close vision purposes by far-sighted persons.

It is an object of the invention to provide eyeglass lenses constructed and arranged in a manner to be adjusted in any angular position convenient to the user for downward vision such as when reading and which when tilted upwardly will lie in the line of horizontal or upward vision to enable the user, for example, to read maps supported on a wall. Thus the invention contemplates that the lenses in either their lowermost or uppermost position are always in a line of sight of the user.

A further object of the invention is to provide a lens connecting bridge for engaging the nose of the user in such a manner as adequately to support the eyeglasses at all times and particularly when pivotally moving the lenses.

Another object is to provide a novel lens frame having a flexible portion which may be sprung slightly outwardly a distance sufficient to enable easy replacement of the lenses.

Still another object is to provide lens adjustment means of simple construction whereby the lenses may be frictionally held in any desired angular position of adjustment.

Other and further objects and advantages of the present invention will be apparent from the accompanying drawings wherein a preferred embodiment of the principles of the invention has been selected for exemplification.

In the drawings:

Fig. 1 is a front elevational view of a pair of eyeglasses constructed in accordance with the present invention;

Fig. 2 is a side elevational view of the eyeglasses shown in Fig. 1 as they are adapted to be worn by a user, showing the lenses in one extreme position in solid lines and in another extreme position in broken lines; and Fig. 3 is a transverse sectional view taken across the pivotal axis of one of the lens frames shown in Fig. 1 and looking downwardly.

Referring more particularly to the drawings, wherein like numerals refer to like parts, the pair of lenses 10 have each a straight edge and an arcuate edge and are sections of normal sized elliptical lens such as would be formed by drawing a chord below the medial portion of an ordinary lens. In a preferred embodiment, lenses 10 are approximately one-third normal lens area.

Lens frames for each lens 10 are composed of a lower arcuate member 12 channeled to receive the lower arcuate portion of the lens and a horizontal strip 16 secured to the extremities of arcuate member 12 and extending thereacross to engage the upper straight edge of the lens. Strip 16 is preferably of flexible material and, as shown in Fig. 3, may conform in general to the concavo-convex curvature of the straight edge of the lens. To facilitate replacement of lens 10 whenever desired, the lateral edges of strip 16 may project slightly outwardly beyond the lens faces in a manner whereby an edge of the strip may be engaged by any suitable instrument, such as the fingernail of the user, and the strip slightly elevated to enable removal and replacement of the lens.

For interconnecting the lens frames and supporting the eyeglasses upon the user, a connecting bridge is provided indicated in its entirety at 18. Connecting bridge 18 may, if desired, be formed of a single molded piece of suitable material and preferably includes upper and lower horizontal portions 20 and 22, respectively, for engaging the nose of the user at vertically spaced points for a purpose to be hereinafter explained.

The lens frames are pivotally secured to opposite sides of bridge or nose piece 18 and to this end upright posts 24 are provided at each side of the member 18 having their lower extremities apertured to receive rivets or other suitable connecting pins 26 which engage adjacent upright ears 28 provided integral with the lens frame strips 16. Ears 28 are similarly provided at the outer extremities of strips 16 adjacent to upright temple posts 30 to the upper ends of which are hinged the usual temple members 31.

For pivotally and adjustably securing the lens frames to the lower portions of posts 30, spindles 32 are provided which project through apertures in the posts 30 and are rigidly secured at their inner ends to adjacent ears 28 and carry at their outer ends knurled adjusting knobs 34. So that the lenses 10 will remain fixed in any adjusted position the outer ears 28 of the lens frames are held in close frictional engagement with posts 30 by means of coiled springs 36 disposed axially of spindles 32 and bearing against adjacent faces of posts 30 and knobs 34. Sleeves 38 encase spindles 32 and springs 36 to protect the same and to provide a neat appearance. Lenses 10 may be adjusted to any desired angular position merely by rotating knobs 34 pivotally to swing the lenses on their horizontal axes. The vertically spaced bars 20 and 22 of nose piece 18 securely brace the eyeglasses when knobs 34 are rotated and at all times provide adequate and comfortable support.

The use and operation of the device herein shown and described will be readily apparent. As best shown in Fig. 2, the eyeglasses in ordinary use will have the lenses 10 extending downwardly and preferably disposed at a slight angle to the vertical so that the line of vision of the user when looking downwardly will be perpendicular to the lens thus utilizing the full area of the lenses for reading or other close vision. The frame strips 16 and straight upper edges of lenses 10, as shown, are positioned below the horizontal or normal line of vision of the user so that no obstruction or other interference for ordinary or far vision is provided. Whenever the user desires to read in a horizontal line or a line slightly upwardly of the horizontal, wall maps for example, knobs 34 may be rotated pivotally to turn lenses 10 to an upwardly extending position such as that shown in broken lines of Fig. 2. When thus upwardly extended lenses 10 are positioned directly in the horizontal or upward line of vision of the user and are capable of any angular adjustment necessary to bring the lenses in a plane perpendicular to the line of vision. In whatever angular position assumed, lenses 10 will remain fixed in that position by the tension of spring 32 and the general construction and arrangement of the pivotal mountings for the lens frames.

It is to be understood that the specific construction herein shown and described is capable of such modification as may fall within the scope of the following claims:

I claim:

1. Eyeglasses comprising, a nose bridge rest, a pair of upright elongated lens frame supporting posts carried by the upper portion of said rest, a pair of upright temple posts, the said lens frame supporting and temple posts extending downwardly of the upper portion of said rest, temple members secured to the upper ends of said temple posts, lens frames having a straight edge and an arcuate edge, means carried by the lower ends of said posts for pivotally supporting a frame along its straight edge between the lower end portions of each lens frame supporting post and adjacent temple post for adjustment in uppermost or lowermost pivotal position, lenses secured in said frames, the said lens frame supporting posts and temple posts extending downwardly of the upper portion of said rest a sufficient distance so that the supported lenses in lowermost postion are disposed below the horizontal line of vision of the user and the said lens supporting posts and temple posts being disposed a substantial distance forwardly of the eyes of the user sufficient to permit the lenses to be pivotally turned inwardly in a plane perpendicular to the downward line of vision of the user.

2. The eyeglasses of claim 1 wherein the nose bridge rest is vertically elongated and carries transverse portions to engage vertically spaced areas of the nose whereby to provide a brace for the eyeglasses when the lenses are pivotally turned.

3. The eyeglasses of claim 1 wherein the lenses are of segmented elliptical shape and less than semi-elliptical.

JOHN L. ROONEY.

REFERENCES CITED

The following references are of record in the file of this patent:

UNITED STATES PATENTS

| Number | Name | Date |
| --- | --- | --- |
| 190,133 | Doten | May 1, 1877 |
| 194,345 | Franklin | Aug. 21, 1877 |
| 291,778 | Roberts | Jan. 8, 1884 |
| 319,733 | Lazarus | June 9, 1885 |
| 505,650 | Francis | Sept. 26, 1893 |
| 591,152 | Bausch | Oct. 5, 1897 |
| 772,196 | Ward | Oct. 11, 1904 |
| 1,309,793 | Bergsvik | July 15, 1919 |
| 1,558,744 | Miner | Oct. 27, 1925 |
| 1,988,646 | Dirr | Jan. 22, 1935 |

FOREIGN PATENTS

| Number | Country | Date |
| --- | --- | --- |
| 16,123 | Great Britain | of 1895 |
| 20,229 | Great Britain | Sept. 5, 1912 |
| 335,345 | Great Britain | Sept. 25, 1930 |